Nov. 24, 1970   F. M. MINKS   3,543,109
SPEED INDICATING APPARATUS FOR AN INTERNAL COMBUSTION
ENGINE HAVING AN ELECTRONIC IGNITION SYSTEM
Original Filed Oct. 4, 1965
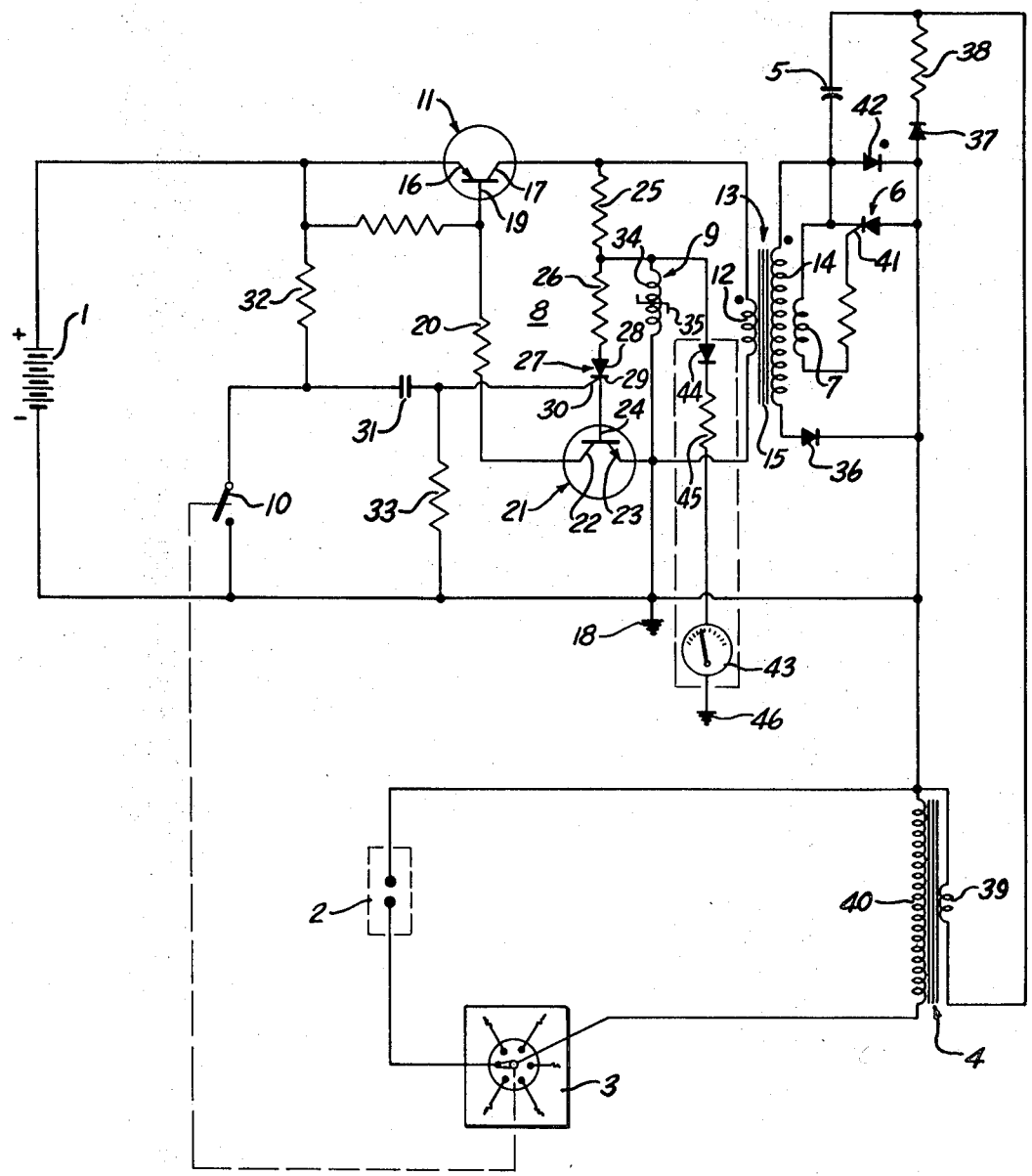
INVENTOR.
FLOYD M. MINKS
BY
ATTORNEYS

United States Patent Office 3,543,109
Patented Nov. 24, 1970

3,543,109
SPEED INDICATING APPARATUS FOR AN INTERNAL COMBUSTION ENGINE HAVING AN ELECTRONIC IGNITION SYSTEM
Floyd M. Minks, Kissimmee, Fla., assignor to Brunswick Corporation, Chicago, Ill., a corporation of Delaware
Original application Oct. 4, 1965, Ser. No. 492,570. Divided and this application Apr. 10, 1968, Ser. No. 720,220
Int. Cl. G01p 3/12
U.S. Cl. 324—169         2 Claims

ABSTRACT OF THE DISCLOSURE

This disclosure relates to a tachometer coupled to a blocking oscillator converter of a capacitor discharge ignition system including a saturable magnetic core which is driven into saturation during each firing pulse formation of the converter. The tachometer readout device is connected in series with a diode and resistor across the saturable magnetic core unit and is directly driven by the average level of the output pulses and therefore directly proportional to the engine r.p.m.

---

This invention relates to a speed indicating apparatus and particularly to a tachometer for indicating the rotational speed of an internal combustion engine. This application is a division of application entitled Blocking Oscillator, with Ser. No. 492,570, filed on Oct. 4, 1965.

Tachometers employed in connection with internal combustion engines provide a continuous reading of the engine rotation. This information may be employed to maximize efficiency of operation and, with a manual gear shift means, to indicate the optimum time for shifting.

Generally, tachometers have been constructed as accessory equipment for devices employing engines because of the expense in producing a suitable circuit to drive the readout means.

The present invention is particularly directed to an improved tachometer which in a particularly novel aspect is coupled to a converter of an ignition system such as a capacitor discharge ignition system. The converter produces an average level output proportional to engine speed and thereby provides relatively inexpensive and accurate readout.

The tachometer readout means is preferably coupled to the ignition circuit by a saturable magnetic unit which is driven into saturation during each firing pulse formation and causes the readout means to be driven in accordance with average converter output.

In a preferred and novel arrangement, the ignition system converter includes a blocking oscillator employing a saturable magnetic unit to terminate a pulse and thereby regulate the energy per firing pulse. In accordance with the present invention, the tachometer readout means is connected across the saturable magnetic unit of the converter and is directly driven by the average level of the output pulses and therefore directly proportional to the engine r.p.m.

In a preferred construction of the present invention, the triggering and the feedback circuit of the oscillator employs a control transistor connected in the base circuit of the main charging control transistor with the input of the control transistor connected in circuit through a silicon controlled rectifier or the like. The gate of the silicon controlled rectifier and the base of the control transistor are connected to a suitable signal source which in turn is controlled in accordance with the timing of the internal-combustion engine to provide periodic turn-on pulses to the silicon controlled rectifier and transistor. A square loop core unit is connected to divert current from the silicon controlled rectifier and the input of the control transistor, and thereby turns off the main charging control transistor and provides the pulse energy transfer. A tachometer readout means is connected in parallel with the square loop core unit.

The drawing furnished herewith illustrates a preferred construction of the present invention in which the above advantages and features are clearly disclosed as well as others which will be clear from the following description of the drawing.

The drawing is a schematic circuit diagram of an ignition system employing a blocking oscillator constructed in accordance with the present invention.

Referring to the drawing, the illustrated ignition system is connected to a direct current source such as a low voltage battery 1 having a suitable rated output voltage such as 6, 12, or 24 volts all of which are presently employed in automobiles, trucks, outboard motors or other similar internal-combustion engines. A single spark gap 2 is illustrated forming a part of a combustion chamber of the prime mover. In multicylinder engines, a plurality of spark gaps will normally be employed with a distributor 3, shown in block diagram, provided to sequentially distribute the power to the several gaps in accordance with known practice. The illustrated embodiment of the present invention employs a pulse transformer 4 which couples the spark gap 2 to a capacitor discharge circuit including a storage capacitor 5 connected to be discharged through the transformer 4 in series with a silicon controlled rectifier 6. A firing control transformer winding 7 is connected to the rectifier 6 and provides controlled firing thereof in timed relation to the operation of the internal-combustion engine and the distributor 3 as hereinafter described and thereby causes proper transfer of energy from the capacitor 5 to gap 2.

The capacitor 5 is connected to be charged from the battery 1 through a triggered blocking oscillator 8 which includes a square loop core unit 9 to regulate the energy per pulse as hereinafter described.

An input switch 10 is coupled to be actuated in synchronism with the operation of the engine, diagrammatically shown coupled to the operation of the distributor 3, to provide periodic triggering of the blocking oscillator 8 into conduction.

The oscillator 8 generally includes a charging transistor 11 connected in series with a primary 12 of a transfer or oscillating transformer 13. A secondary 14 of transformer 13 is connected in a charging circuit with the capacitor 5, as hereinafter described. The circuit is such that during the conduction through the primary 12 from the battery 1 the capacitor circuit 5 is effectively opened. When the current through the transformer primary 12 is cut off, a pulse is generated in the secondary which is conducted to charge the capacitor 5. This charge is transmitted to the gap 2 as noted above at the initiation of the subsequent charging of the transformer 13.

Generally, the circuit operation includes the opening of the switch 10 to initiate operation of the oscillator 8 which derives power from the battery 1 with a portion of the current passing through the square loop core unit 9. When the square loop core unit is saturated however it will rapidly turn off the oscillator 8 and the collapsing field in transformer 13 produces a current in the secondary 14 which charges capacitor 5 to a corresponding level. The square loop core unit 9 determines the on time of the oscillator 8 as a function of the battery voltage and therefore regulates the energy in the pulse transferred to the capacitor 5. The silicon controlled rectifier 6 is fired therefore by a pulse generated in winding 7, whch is wound as a part of transformer 13, during the initial conduction of oscillator 8 and in timed relation to the operation of the distributor 3 and the movement of the piston, not shown, to provide proper transfer of energy from the capacitor 5 through the pulse transformer 4 to the gap 2.

More particularly in the illustrated embodiment of the invention, the oscillator circuit includes the transistor 11, shown as a PNP type, connected in a common emitter configuration; having an emitter 16, as an input-output element, connected to the positive side of the battery 1 and a collector 17, as an output element, connected to the one side of the primary winding 12. The opposite side of the transformer primary winding 12 is connected to the negative side of the battery 1 through a common ground connection 18. The transistor 11 includes a base 19 as the input element which is connected to derive its power from the battery 1 as follows. The base 19 is connected to the negative terminal of the battery 1 through a dropping resistor 20 and a transistor 21 to ground which controls the turning on or conduction through the transistor 11.

The transistor 21 is shown as an NPN type having the collector connected through resistor 20 to the base 19 and the emitter 23 connected to the ground terminal 18. An input base 24 of the transistor 21 is connected to derive power from the collector 17 of transistor 11 after initiation of the triggering of the blocking oscillator 8. The connection to the collector 17 is through a resistor 25, a resistor 26 and a silicon controlled rectifier 27 to provide a selectively completed or triggered voltage dividing network. Thus, the feedback winding commonly used in blocking oscillators is eliminated. A feedback winding could be used; for example, other considerations necessitated the grounding of collector 17 of transistor 11.

The silicon controlled rectifier 27 includes an anode 28 connected to the adjacent series resistor 26 and the cathode 29 connected to the base 24 of transistor 21. A gate 30 of the silicon controlled rectifier 27 controls conduction through the rectifier from the anode 28 to the cathode 29. The gate 30 is connected to the positive side of the battery 1 through a direct current blocking capacitor 31 and the resistor 32. Switch 10 is connected between the negative side of battery 1 and the junction of capacitor 31 and resistor 32. Thus, whenever switch 10 is open, a circuit is momentarily completed from the positive side of the battery through the resistor 32, capacitor 31, gate 30 and cathode 29 to the base 24 of transistor 21 and then through the emitter 23 to the negative side of the battery 1 and ground 18. Consequently, the silicon controlled rectifier 27 and transistor 21 will be biased to conduct and permit current to flow and provide an input bias on the transistor which in turn provides an input signal on the base 19 of transistor 11. Regenerative action to the base 24 of the transistor 21 causes it to conduct at a greater rate. The current will thus increase through the transistors 11 and 21 and the series connected transformer primary 12 with the energy being stored in the core 15. The square loop core unit 9 is connected to cut off conduction.

When the switch 10 again closes, capacitor 31 discharges through resistor 33.

The illustrated pulse forming circuit including switch 10 has been shown for purposes of clearly illustrating the functioning of the oscillator and may be replaced with any other appropriate timing mean adapted to generate a short duration pulse.

The core unit 9 may be of any known or suitable construction and is diagrammatically shown including a winding 34 is relatively high until the knee of the core characteristic is reached and then rapidly changes to a relatively very small value. Winding 34 is connected between the junction of resistors 25 and 26 and the emitter 23 of transistor 21 and thus directly across the circuit of the silicon controlled rectifier 27 and the input circuit of the transistor 21. When transistor 11 begins to conduct, a part of the current is diverted through the winding 34 of square loop core unit 9 which provides a relatively high impedance to the current flow until it reaches saturation. When it changes to the saturated condition, the reactance reduces substantially and essentially to zero and provides a direct bypass or shunt around the silicon controlled rectifier 27 and the input circuit of the transistor 21. The silicon controlled rectifier 27 and the transistor 21 stop conducting and the bias on the base 19 of the transistor 11 is removed. This opens the circuit from the battery 1 to stop the input current flow. The voltage dividing resistors 25 and 26 are provided to insure reset of the unit 9 and to prevent excessive current in the circuit when unit 9 is saturated.

The core unit 9 thus acts as a switch sensitive to the volt-time integral applied to it. In the broadest aspect of the present invention, other switch means including semiconductors connected to be turned on by either the volt-time integral applied or by the current through winding 12 of transformer 13, which is proportional to the volt-time integral, can be employed to regulate the energy in each cycle or single pulse generated by the oscillator.

When the core unit 9 terminates conduction, the magnetic field in the core 15 of the transformer 13 collapses and induces a voltage of opposite polarity in the secondary winding 14 to cause a current flow through the capacitor charging circuit which includes a blocking diode 36, a protective diode 37 and a resistor 38 connected to the positive side of the capacitor 5. The opposite side of the capacitor 5 is connected to the opposite side of the transformer secondary 14. This will permit charging of the capacitor to the selected value determined by the cutoff of the oscillator 8 through the action of the square loop core 9.

The capacitor 5 subsequently discharges through transformer 4 by triggering of the silicon controlled rectifier 6.

Transformer 4 includes a primary 39 connected in series with the silicon controlled rectifier 6 directly across the capacitor 5. The illustrated transformer 4 includes a secondary 40 connected across the spark gap 2 in series with the distributor 3.

The silicon controlled rectifier 6 generally corresponds to the rectifier 27 and includes a gate 41 connected to the trigger winding 7 which is wound as a small secondary on the oscillator transformer 13. Winding 7 is wound with respect to the primary 12 to provide a trigger pulse during the starting cycle of the oscillator 8. Consequently, when the switch 10 is opened to initiate operation of the oscillator 8, the transformer winding 7 produces a firing pulse which causes rectifier 6 to conduct and discharge the previous charge on the capacitor 5 through the pulse transformer 4 for firing of the spark gap 2.

Generally, in accordance with the teaching of applicant's previously identified copending application, a Zener diode is connected in parallel with the silicon controlled rectifier as a protective device.

Additionally, in the illustrated embodiment of the invention, a simple tachometer circuit is connected in the circuit with the square loop core unit 9 to provide an inexpensive speed readout device. The tachometer circuit includes a tachometer meter 43 connected in series with a diode 44 and a resistor 45 between the junction of resistors 25 and 26 and thus the common connection to the square loop core unit 9. The opopsite side of the tachometer meter 43 is connected to ground as shown at 46. The volt-time integral across the square loop core unit 9 is essentially the same for all battery voltages. The oscillator circuit generally produces a volt-time integral which is independent of battery voltage and consequently the tachometer circuit may also be connected directly across the primary 12. The tachometer meter 43 indicates the average current and consequently gives an output signal directly proportional to the speed at which the engine is turning over.

The operation of the illustrated embodiment of the invention may be briefly summarized as follows.

The switch 10 is coupled to the distributor 3 to be driven in accordance with the movement of the pistons of the internal-combustion engine in accordance with any suitable or known system. The battery 1 provides a source of energy to the oscillator 8 which is transferred to the capacitor 5 to charge it to a selected level whenever the switch 10 is opened to initiate conduction through a gate circuit of silicon controlled rectifier 27 and the input or base loop of transistor 21. The transistor 11 then conducts and provides a charging current until the square loop core unit 9 is saturated at which time it rapidly turns the oscillator off, terminating the charging of the transformer 13 and transferring a charging pulse to the capacitor 5.

The next time the switch 10 is opened the charging cycle is again initiated. The winding 7 fires the silicon controlled rectifier 6 and completes the discharge circuit for the capacitor 5 through the pulse transformer 4. The capacitor 5 is therefore rapidly discharged through the pulse transformer to fire the proper spark gap 2 or the like during the charging of the transformer 13. The capacitor 5 cannot discharge back to the transformer 13 as a result of the blocking diode 36.

The present invention thus provides an improved blocking oscillator which provides a highly efficient means for controlling the charging of a capacitor 5 to a preselected level and maintains essentialy predetermined constant operation independently of the level of the voltage source over a wide variation in the voltage level thereof as well as the operating speed of the engine over the ranges selected and determined by the particular value of the several components in the system. This energy level is primarily dependent upon the characteristics of the core unit 9 and transformer 13 and to a slight extent the resistors 25 and 26 and is essentially independent of the exact value of the switching element parameters of the oscillator such as gain of the transistor and the exact value of the capacitor 5.

For purposes of the present invention, a blocking oscillator includes an inductive energy storage means connected to an energy source through a switch means having at least one input means connected to derive power in a feedback loop from the output and the storage means is connected in an output circuit to deliver the stored energy upon the decrease of current into the inductive energy storage means.

Various modes of carrying out the invention are contemplated as being within the scope of the following claims particularly pointing out and distinctly claiming the subject matter which is regarded as the invention.

I claim:

1. An indicating apparatus for an internal-combustion engine having an electrically actuated engine firing means adapted to be connected to an energy source means comprising an energy transfer circuit having an inductive energy storage means connecting the energy source means to the firing means, said energy transfer circuit having a main charging control transistor means and a turn-on means connected to said transistor means to initiate generation of a single pulse signal to supply a corresponding energy to the inductive storage means and a separate saturable magnetic means independent of said turn-on means connected in parallel to the storage means such that the volt-time integral of the pulse signal impressed upon the magnetic means is linearly related to the pulse signal impressed on said magnetic means and said magnetic means is connected to such transistor means to rapidly terminate the conduction of the transistor means and thereby the single pulse signal at a corresponding constant volt-time integral independent of the input voltage and the engine speed and thereby produces a preselected constant energy per firing pulse essentially independent of changes in engine speed and potential of said source means, means to connect the inductive storage means to the firing means to impress said pulse signals on the firing means after termination of said pulse signal, and an indicating means including a meter means in series with a resistance means connected to said energy transfer circuit in parallel with said energy storage means and said magnetic means and actuated by successive pulse signals to establish an output in accordance with the average output of the successive pulse signal and thereby the speed of the engine.

2. The indicating apparatus of claim 1 wherein said saturable magnetic means includes a winding connected in series with a resistance across said inductive energy storage means and said meter means in series with said resistance means and in series with a diode is connected directly across said winding.

References Cited

UNITED STATES PATENTS

| 2,899,632 | 8/1959 | Lawson | 123—148 |
| 3,064,188 | 11/1962 | Dreiske | 324—70 |
| 3,115,604 | 12/1963 | Szymber | 324—70 |
| 3,312,211 | 4/1967 | Boyer | 123—148 |
| 3,363,615 | 1/1968 | Meyerle | 123—148 |

RUDOLPH V. ROLINEC, Primary Examiner

M. J. LYNCH, Assistant Examiner

U.S. Cl. X.R.

123—148